(12) United States Patent
Schirmann

(10) Patent No.: US 6,482,383 B1
(45) Date of Patent: Nov. 19, 2002

(54) METHOD FOR PREPARING HYDRAZINE HYDRATE

(75) Inventor: Jean-Pierre Schirmann, Paris (FR)

(73) Assignee: Atofina (FR)

( * ) Notice: Subject to any disclaimer, the term of this patent is extended or adjusted under 35 U.S.C. 154(b) by 0 days.

(21) Appl. No.: 09/674,574

(22) PCT Filed: May 6, 1999

(86) PCT No.: PCT/FR99/01074

§ 371 (c)(1),
(2), (4) Date: Oct. 31, 2000

(87) PCT Pub. No.: WO99/58446

PCT Pub. Date: Nov. 18, 1999

(30) Foreign Application Priority Data

May 14, 1998 (FR) .............................................. 98 06077

(51) Int. Cl.[7] .................................................. C01B 21/16

(52) U.S. Cl. ...................................... 423/407; 423/387

(58) Field of Search ................................ 423/387, 407; 564/268

(56) References Cited

U.S. PATENT DOCUMENTS

| | | | | | |
|---|---|---|---|---|---|
| 3,869,541 A | * | 3/1975 | Weiss et al. | ................. | 423/407 |
| 3,976,756 A | * | 8/1976 | Wojtowicz | .................. | 423/407 |
| 4,657,751 A | | 4/1987 | Alicot et al. | ................. | 423/407 |
| 4,963,232 A | * | 10/1990 | Kuriyama et al. | ............. | 203/12 |
| 5,393,508 A | * | 2/1995 | Krempf et al. | ............... | 203/88 |

FOREIGN PATENT DOCUMENTS

JP 56-59608 5/1981

\* cited by examiner

*Primary Examiner*—Stanley S. Silverman
*Assistant Examiner*—Edward M. Johnson
(74) *Attorney, Agent, or Firm*—Pennie & Edmonds LLP

(57) ABSTRACT

A method for preparing hydrazine hydrate comprising: (a) reacting ammonia, hydrogen peroxide and methyl ethyl ketone in a working solution to form an azine; (b) separating the working solution from a mixture comprising the azine, methyl ethyl ketone oxime and optionally the methyl ethyl ketone which had not reacted; (c) recycling the working solution to step (a) after an optional treatment; (d) hydrolyzing the azine to obtain hydrazine hydrate and regenerating the methyl ethyl ketone; (e) recycling to step (a) the methyl ethyl ketone. In step (d) the methyl ethyl ketone oxime is purged.

5 Claims, No Drawings

METHOD FOR PREPARING HYDRAZINE HYDRATE

The present invention relates to a process for the preparation of hydrazine hydrate. The present invention relates more specifically to an improved process for the manufacture of hydrazine hydrate from methyl ethyl ketone azine obtained by oxidation of ammonia with hydrogen peroxide in the presence of a coreactant or of a catalyst.

The industrial production of hydrazine hydrate is carried out according to the Raschig, Bayer or hydrogen peroxide processes.

In the Raschig process, ammonia is oxidized with a hypochlorite in order to obtain a dilute hydrazine hydrate solution, which solution subsequently has to be concentrated by distillation. This process is not very selective, has a low yield and is highly polluting, and is virtually no longer used.

The Bayer process is an alternative form of the Raschig process which consists in shifting a chemical equilibrium by trapping, using acetone, the hydrazine formed in the azine form $(CH_3)_2C=N-N=C-(CH_3)_2$. The azine is subsequently isolated and then hydrolysed to hydrazine hydrate. The yields are improved but there is no improvement with respect to the discharges to the environment.

The process with hydrogen peroxide consists in oxidizing a mixture of ammonia and a ketone with hydrogen peroxide in the presence of a means for activating the hydrogen peroxide in order to directly form the azine, which it is sufficient subsequently to hydrolyse to hydrazine hydrate. The yields are high and the process is not polluting. This process with hydrogen peroxide is used by the Applicant Company and is disclosed in numerous patents, for example U.S. Pat. No. 3,972,878, U.S. Pat. No. 3,972,876, U.S. Pat. No. 3,948,902 and U.S. Pat. No. 4,093,656.

The hydrolysis of an azine to hydrazine hydrate is disclosed in Patents U.S. Pat. No. 4,724,133 (Schirmann et al.), U.S. Pat. No. 4,725,421 (Schirmann et al.) and GB 1,164,460. This hydrolysis is carried out in a distillation column which is fed with water and azine. The ketone is recovered at the top and the hydrazine hydrate at the bottom.

EP 70,155 also discloses another hydrogen peroxide process.

These processes are also described in Ullmann's Encyclopedia of Industrial Chemistry (1989), vol. A 13, pages 182–183 and the references included.

In hydrogen peroxide processes, ammonia is oxidized with hydrogen peroxide in the presence of a ketone and of a means for activating the hydrogen peroxide according to the following overall reaction, an azine being formed:

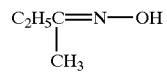

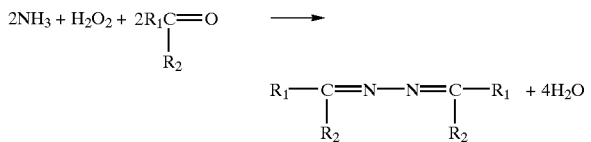

The activation means can be a nitrile, an amide, a carboxylic acid or a selenium, antimony or arsenic derivative. The azine is then hydrolysed to hydrazine and the regenerated ketone is recycled according to the following reaction:

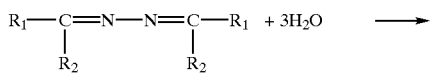

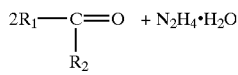

This hydrolysis is carried out in a distillation column. The ketone is recovered at the top and the hydrazine hydrate at the bottom. The Applicant Company has discovered that, in these hydrogen peroxide processes and using methyl ethyl ketone (MEK), small amounts of a by-product, MEK oxime $$C_2H_5\underset{\underset{CH_3}{|}}{C}=N-OH$$

were formed and that the presence of this oxime disrupted the operation of the process. In particular, the oxime is difficult to separate from the azine, it is found in the column for hydrolysis of the azine and it leads to decomposition of the hydrazine hydrate. The process of the invention consists in bleeding off this oxime.

The present invention is therefore a process for the preparation of hydrazine hydrate, in which:
 (a) ammonia, hydrogen peroxide and methyl ethyl ketone are reacted in the presence of a working solution in order to form an azine;
 (b) the working solution is separated from the azine comprising methyl ethyl ketone oxime and optionally methyl ethyl ketone;
 (c) the working solution is recycled to the stage (a) after an optional treatment;
 (d) the azine is hydrolysed in order to obtain hydrazine hydrate and the methyl ethyl ketone is regenerated;
 (e) the methyl ethyl ketone is recycled to the stage (a), this process being characterized in that, in the stage (d), methyl ethyl ketone oxime is bled off.

Stage (a)

The hydrogen peroxide can be used in the usual commercial form, for example as an aqueous solution comprising between 30 and 90% by weight of $H_2O_2$. One or more conventional stabilizers for peroxide solutions can advantageously be added, for example phosphoric acid, pyrophosphoric acid, citric acid, nitrilotriacetic acid, ethylenediaminetetraacetic acid or the ammonium or alkali metal salts of these acids. The amount to be used is advantageously between 10 and 1000 ppm and preferably between 50 and 250 ppm of the combined reactants and working solution at the reactor inlet. The ammonia can be anhydrous or in aqueous solution The working solution comprises a means for activating the hydrogen peroxide, that is to say a product such that the azine can be produced from ammonia, hydrogen peroxide and methyl ethyl ketone.

This activator can be chosen from organic or inorganic oxyacids, their ammonium salts and generally their derivatives: anhydrides, esters, amides, nitriles, acyl peroxides, or their mixtures. Use is advantageously made of amides, ammonium salts and nitrites.

Mention may be made, by way of examples, of (i) amides of carboxylic acids of formula $R_5OOH$, in which $R_5$ is hydrogen, a linear alkyl radical having from 1 to 20 carbon atoms, a branched or cyclic alkyl radical having from 3 to 12 carbon atoms or a phenyl radical which can be substituted, or (ii) amides of polycarboxylic acids of formula $R_6(COOH)_n$, in which $R_6$ represents an alkylene radical having from 1 to 10 carbon atoms and n is an integer greater than or equal to 2, or $R_6$ can be a single bond and then n has the value 2. The $R_5$ and $R_6$ radicals can be substituted by halogens or OH, $NO_2$ or methoxy groups. Mention may also be made of the amides of the organic acids of arsenic. The organic acids of arsenic are, for example, methylarsonic acid, phenylarsonic acid and cacodylic acid.

The preferred amides are formamide, acetamide, monochloroacetamide and propionamide.

Use is advantageously made, among ammonium salts, of the salts of hydracids, of inorganic oxyacids, of arylsulphonic acids, of $R_5COOH$ acids or of $R_6(COOH)_n$ acids, $R_5$, $R_6$ and n being defined above, or of the organic acids of arsenic.

The preferred ammonium salts are the formate, acetate, monochloroacetate, propionate, phenylarsonate and cacodylate. Mention may advantageously be made, among the nitriles, of the products of formula $R_7(CN)_n$, it being possible for n to vary from 1 to 5, depending on the valency of $R_7$, and $R_7$ being a cyclic or non-cyclic alkyl having from 1 to 12 carbon atoms or benzene or pyridine. $R_7$ can be substituted by groups which are not oxidized in the reactor of the stage a, for example halogens or carboxyl, carboxylic ester, nitro, amine, hydroxyl or sulphonic acid groups.

The preferred nitriles are acetonitrile and propionitrile.

The working solution is formed by dissolving one or more products chosen from organic or inorganic oxyacids, their ammonium salts and generally their derivatives: anhydrides, esters, amides, nitriles, acyl peroxides, or their mixtures. Use is advantageously made of the preceding amides, ammonium salts or nitriles.

This solution can be aqueous or based on an alcohol or on a mixture of alcohol and water. Use is advantageously made, among the alcohols, of saturated aliphatic alcohols having from 1 to 6 carbon atoms and preferably 1 or 2 carbon atoms.

Use is also advantageously made of diols and more particularly of diols having from 2 to 5 carbon atoms. Mention may be made, for example, of glycol, propylene glycol, 1,3-propanediol, 1,3- and 1,4-butane-diol and 1,5-pentanediol.

According to an advantageous form of the invention, the working solution is an alcoholic solution of an organic acid of arsenic and is disclosed in Patent EP 70,155, the contents of which are incorporated in the present application. According to another advantageous form of the invention, the working solution is an aqueous solution of an amide of a weak acid and of the ammonium salt corresponding to this acid, such as disclosed in Patent EP 487,160.

These amides of weak acids are derived from the corresponding carboxylic acids which have a dissociation constant of less than $5 \times 10^{-5}$, that is to say acids which have a pK of greater than 4.3 in aqueous solution at 25° C.

For the polycarboxylic acids, these are the acids for which the constant of the first ionization is less than $5 \times 10^{-5}$.

Mention may be made, by way of examples, of the carboxylic acids of formula $R_8COOH$, in which $R_8$ is a linear alkyl radical having from 1 to 20 carbon atoms or a branched or cyclic alkyl radical having from 3 to 12 carbon atoms or a phenyl radical which can be substituted, or of polycarboxylic acids of formula $R_9(COOH)_n$, in which $R_9$ represents an alkylene radical having from 1 to 10 carbon atoms and n is a number greater than or equal to 2, or $R_9$ can be a single bond and then n has the value 2. The $R_8$ and $R_9$ radicals can be substituted by halogens or OH, $NO_2$ or methoxy groups. Use is preferably made of acetamide, propionamide, n-butyramide or isobutyramide.

The ammonium salt corresponding to acetamide is ammonium acetate.

It would not be departing from the scope of the invention to form the ammonium salt in situ, that is to say to use the corresponding carboxylic acid which gives the ammonium salt by reaction with ammonia.

The proportions of the amide and of the corresponding ammonium salt can vary within wide limits. Use is usually made of 1 to 25 parts of the ammonium salt per 5 parts of amide and preferably 2 to 10.

The reactants can be used in stoichiometric amounts. However, use is made, per mole of hydrogen peroxide, of 0.2 to 5 mol and preferably of 1.5 to 4 mol of methyl ethyl ketone and of 0.1 to 10 mol and preferably of 1.5 to 4 mol of ammonia. The amount of working solution is between 0.1 and 1 kg per mole of hydrogen peroxide. This amount depends on its quality, that is to say on its catalytic strength or its activity which makes it possible to convert the reactants to azine. The proportions of the reactants laid down above make it possible to obtain complete conversion of the hydrogen peroxide and a production of azine corresponding to more than 50%, and which can reach 90%, of the hydrogen peroxide charged.

The hydrogen peroxide, ammonia and methyl ethyl ketone can be brought into contact with the working solution in any way.

The reaction is advantageously carried out in a homogeneous medium or in a medium which provides at least sufficient solubilization of the reactants for it to be possible to obtain the azine. The reaction can be carried out in a very wide temperature range, for example between 0 and 100° C., and is advantageously carried out between 30 and 70° C. Although it is possible to carry out the reaction at any pressure, it is simpler to be at atmospheric pressure. However, the pressure can rise up to approximately 10 bar if this is necessary in order to preferably maintain the reaction of the stage a in the liquid phase.

The reactants can be introduced simultaneously or separately and in any order into the working solution. It is possible to use all kinds of reactors, stirred or nonstirred, or even simple tanks, which can be arranged in parallel or in series, cocurrentwise or countercurrentwise, or any combination of these possibilities.

Stage (b)

Known means, such as liquid-liquid extraction, distillation, separation by settling or any combination of these possibilities, are used to separate (i) the azine and optionally the excess methyl ethyl ketone and (ii) the working solution.

Methyl ethyl ketone is advantageous because its azine is insoluble in the working solution.

The working solution can be treated in the stage (c).

The stages (a), (b) and (c) are disclosed, for example, in Patents EP 399,866 and EP 518,728, the contents of which are incorporated in the present application.

The Applicant Company has observed, for example, that the azine obtained in the stage (b), after separation from the working solution, is accompanied by unreacted methyl ethyl ketone and by various impurities. The Applicant Company, without being bound by this explanation, believes that these impurities are formed during the stage (a) and are due to the simultaneous presence of hydrogen peroxide, ammonia, methyl ethyl ketone and the agent for activating $H_2O_2$. These impurities include methyl ethyl ketone oxime

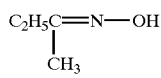

which is difficult to separate by distillation from the azine major product, with the result that, in industrial processes, they are conveyed simultaneously into the equipment which makes possible hydrolysis of the azine to hydrazine hydrate. Doing which, the Applicant Company has discovered that, when this hydrolysis is carried out in a reactive plate column, the oxime is concentrated on certain plates but an abnormal decomposition of the hydrazine hydrate is also observed, resulting in significant falls in yield.

The object of the present invention is to provide a means for not suffering from losses in yield by simply drawing off the oxime steadily via a side-stream, so as to prevent it from accumulating. Doing which, it is actually observed that the yield of hydrolysis of the azine to hydrogen hydrate remains high and does not decrease.

The stage (d) is carried out, for example, in a plate or packed column of distillation column type which is fed with the azine originating from the stage (b) and water. The following are obtained: (i) at the top, methyl ethyl ketone in the form of an azeotrope with water, and (ii) at the bottom, an aqueous hydrazine hydrate solution.

The hydrolysis of azines is known. For example, E. C. Gilbert, in an article in the Journal of the American Chemical Society, vol. 51, pages 3397–3409 (1929), describes equilibrium reactions for the formation of azine and the hydrolysis reactions of the latter and provides the thermodynamic parameters of the system in the case of water-soluble azines. For example, the hydrolysis of acetone azine is disclosed in U.S. Pat. No. 4,724,133. As regards azines which are. insoluble in aqueous solutions (for example, methyl ethyl ketone azine

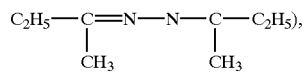

the hydrolysis has to be carried out in a reactive column, such that, by continuously separating the methyl ethyl ketone at the distillation column top and the hydrazine hydrate at the column bottom, complete hydrolysis can be achieved. Of course, this system works best when the operation is carried out continuously, as disclosed in French Patent 1,315,348, British Patent 1,211,547 or Patent U.S. Pat. No. 4,725,421.

In all these patents, the reaction is carried out in a packed distillation column or better. still a plate distillation column operating under a pressure of 2 to 25 bar with a bottom temperature of 150° C. to 200° C.

When the operation is carried out with pure azine, that is to say obtained from hydrazine hydrate and methyl ethyl ketone, for example, it is actually found, by operating according to these patents, that dilute hydrazine hydrate solutions are obtained with a good yield.

In this column, the azine is hydrolysed and the hydrazine hydrate is separated from the methyl ethyl ketone. These conditions are known. A person skilled in the art easily determines the number of plates or the packing height, as well as the points for feeding with azine and with water. Solutions comprising 30 or even up to 45% by weight of hydrazine hydrate are obtained at the bottom. This molar ratio of water to azine in feeding this column is at least greater than stoichiometry and advantageously between 5 and 8. The column bottom is between 150° C. and 200° C., preferably 175 to 190° C. The pressure depends on the boiling temperature of the azine, water and the reactant carrying a carbonyl group. Such a hydrolysis is disclosed in U.S. Pat. No. 4,725,721.

A person skilled in the art can easily determine, according to the number of plates or the packing height, the position of the azine feed and the position of the water feed, the reflux, the nature of the azine, and the like, in what part of the column the maximum oxime concentration is obtained. This is because it is simpler to bleed off the oxime by drawing off at the point of its maximum concentration. Drawing off can be carried out continuously or batchwise, the essential point being to avoid the accumulation of oxime in this column since its presence results in decomposition of the hydrazine hydrate.

The reaction of the stage (a) can produce an azine comprising up to 2% by weight of oxime.

The concentration of oxime is prevented from exceeding 15% by weight on the plates or in the parts of the column of its maximum concentration.

For example, when the operation is carried out with methyl ethyl ketone azine resulting from an oxidation operation with hydrogen peroxide according to Patent EP 70,155 or according to Patents EP 399,866, EP 518,728 or EP 487,160, it is observed that this azine is not pure but that it comprises an amount of oxime which can vary between 0.1 and 1% of methyl ethyl ketone oxime

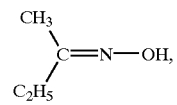

the boiling point of which is 151° C. at atmospheric pressure, in comparison with 161° C. for methyl ethyl ketone azine. It is illusory to want to separate these two compounds by distillation. By means of recycling operations, the level of oxime can even rise to several percent.

The Applicant Company has found that, industrially, the azine comprising the oxime could be introduced into the hydrolysis column and that this oxime, because of its azeotropic behaviour with water, came to be distributed in the column at a level intermediate between the hydrazine hydrate and the methyl ethyl ketone and that, for this reason, it was possible, fairly easily, to separate it via a side-stream. This being the case, the Applicant Company has also found that, if the level of oxime is allowed to rise in the column, an increasing degree of decomposition of the hydrazine hydrate is concurrently observed. This decomposition is related to the presence of oxime, as is shown in the examples.

EXAMPLE 1

In a column made of 316 L stainless steel, with a height of 3 m and a diameter $\emptyset$=70 mm, which is equipped with 40 plates, each 80 mm apart, comprising a perforated single bell cap with a diameter of 27 mm [lacuna]. There are 14 holes in each bell cap, each with a diameter of 2 mm. The working volume of liquid retained on the plate is 33 ml. It can be adjusted by varying the height of the weir.

This column is equipped with temperature probes (thermocouples) on plates No. 3, 6, 10, 13, 15, 19, 26, 28, 31 and 37, as well as at the top and bottom. Sidestream outlets equipped with valves are installed at plates 3, 10, 19, 26, 31 and 37.

The reactants can be introduced at the level of plates 5, 8, 12, 19, 22, 26 and 34. The rate of reflux is measured using a precalibrated rotameter. The heat supply at the column bottom is provided by electrical heating. The shaft of the column is rendered adiabatic by a sheath of hot air obtained by electrical heating, so as to equilibrate the temperatures inside and outside the column.

The reactants are fed via metering pumps.

The condenser is fed with circulating hot oil maintained between 130 and 140° C.

The procedure is as follows: 400 cm³ of doubly deionized water are placed in the boiler (with a volume of 800 cm³) of the column. After the entire apparatus has been sealed, heating is begun and the pressure is allowed to rise to 8 bar. Then, as the water rises up into the column, the inactive materials are bled off while maintaining the pressure at 8 bar. When the level of the boiler reaches 200 cm³, the injection of water is begun at the 34$^{th}$ plate in order to continue to form the water ballast in the column at the rate of 645 g over 1 h 15 minutes. When the temperature reaches 162° at the 19$^{th}$ plate, the injection of azine is begun at the 26$^{th}$ plate at the rate of 543 g of 82.4% azine solution (3.2 mol) over 1 h 30 minutes. Bleeding of the inactive materials from the column is continued while maintaining the pressure at 8 bar. Reflux is allowed to begin and the apparatus is left at total reflux until the reflux liquid is homogeneous. The continuous introduction of the reactants is then begun, as well as drawing off at the bottom and top. The operation is carried out at reflux 1. The azine is introduced in the form of a mixture with MEK at the rate of 275.4 g/h (assaying 82.4% of azine and 3% of MEK oxime) and of 289 g/h of doubly deionized water. The top temperature becomes established at 148° C., whereas the bottom temperature is. 180–181° C. Under stationary conditions, 200 g/h of colourless 35% by weight aqueous hydrazine hydrate solution are drawn off from the bottom. The content of oxime in plate 26 is 14.5% after operating for a few tens of hours. 20 ml of a mixture of azine, hydrazine, oxime and water are drawn off from this plate every five hours. The MEK-water azeotrope is drawn off at the top, which azeotrope represents, after cooling to normal temperature, an organic phase of 300 g/h, assaying 86.5% of MEK, and an aqueous phase of 55 g/h, assaying 20% of MEK.

EXAMPLE 2

The operation is carried out as in Example 1 but with a synthetic MEK azine not comprising oxime. Drawing off is not carried out. A similar result is observed.

EXAMPLE 3

Not in Accordance with the Invention

The operation is carried out as in Example 1 but drawing off from plate 26 is not carried out. It is found that the hydrazine hydrate assay of the material drawn off at the column bottom only assays 31% by weight of hydrazine hydrate.

What is claimed is:

1. A process for the preparation of hydrazine hydrate comprising:

(a) reacting ammonia, hydrogen peroxide and methyl ethyl ketone in a working solution to form an azine and to obtain a mixture comprising the azine, methyl ethyl ketone oxime and optionally unreacted methyl ethyl ketone;

(b) separating the working solution from the mixture;

(c) recycling the working solution to the stage (a);

(d) feeding the mixture in a reactor, hydrolyzing the azine to obtain hydrazine hydrate and regenerating the methyl ethyl ketone; and (e) recycling the methyl ethyl ketone to the stage (a), wherein, in the stage (d), the methyl ethyl ketone oxime is bled off.

2. The process according to claim 1, wherein the reactor used in the stage (d) is a distillation column.

3. The process according to claim 1, wherein, in stage (c), the working solution is recycled to stage (a) after an treatment.

4. The process according to claim 2, wherein the methyl ethyl ketone oxime is bled off by drawing a side stream at a portion of the distillation column.

5. The process according to claim 4, wherein the portion has the maximum concentration of the methyl ethyl ketone oxime in the distillation column.

* * * * *